Sept. 11, 1928.
C. SCHIEBELER
1,684,247
MOTOR CONTROL SYSTEM
Filed June 20, 1927
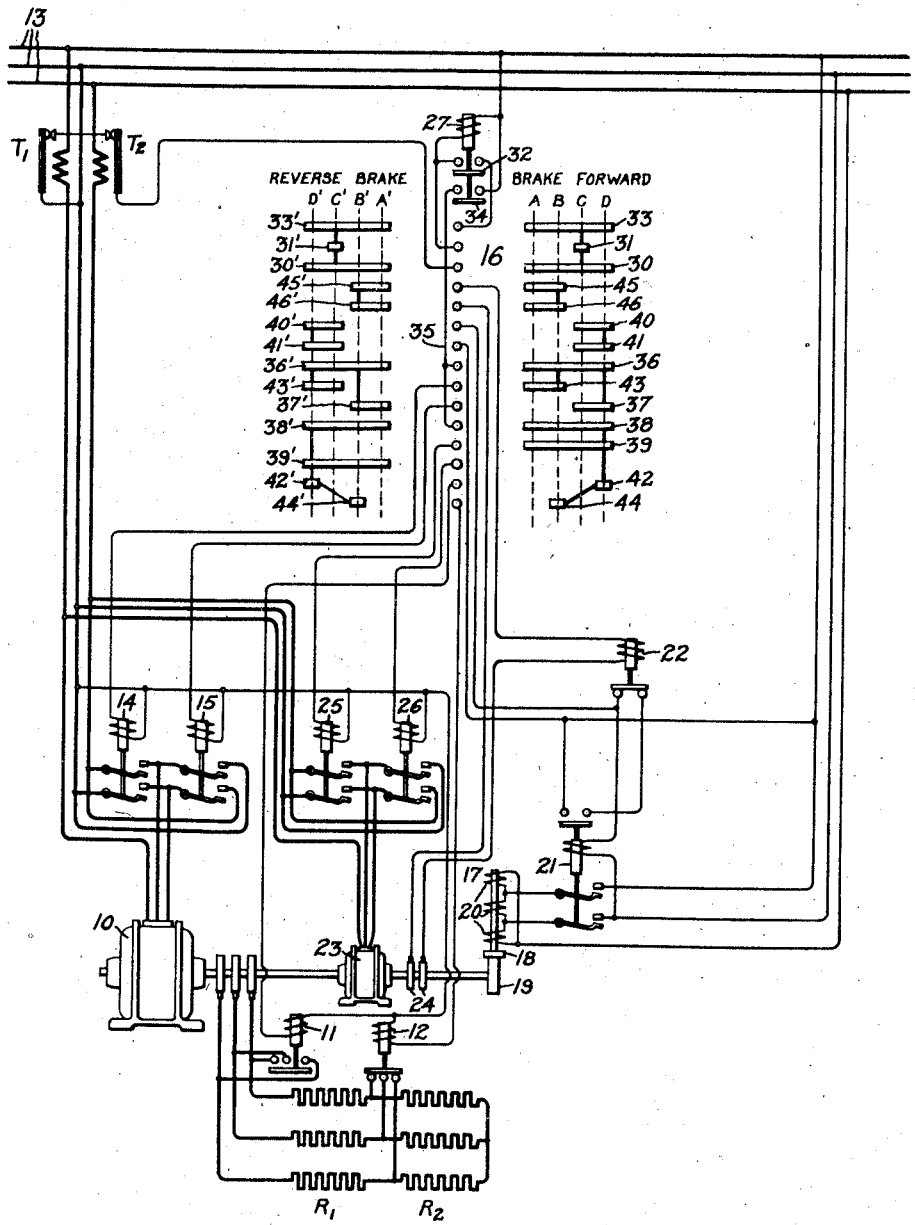
Inventor
Carl Schiebeler,
by
Attorney.

Patented Sept. 11, 1928.

1,684,247

UNITED STATES PATENT OFFICE.

CARL SCHIEBELER, OF BERLIN, GERMANY, ASSIGNOR TO GENERAL ELECTRIC COMPANY, A CORPORATION OF NEW YORK.

MOTOR-CONTROL SYSTEM.

Application filed June 20, 1927, Serial No. 200,092, and in Germany July 1, 1926.

This invention relates to the control of electric motors and more particularly to the control of reversible alternating current motors which are provided with electrically controlled friction brakes and arranged to drive and be driven by an active load, such for example, as a trolley hoist, elevator or the like.

In such service the problem of utilizing the motor and brake to the best advantage in stopping the load after operation in either direction presents considerable difficuty particularly where a load of large inertia is involved. This is due principally to the limitations in using the alternating current motor as an electric brake to reduce the duty on the friction brake. It has been proposed heretofore to obtain a braking action from the alternating current motor prior to application of the friction brake by reversing the motor power connections and thereby obtaining a reversed torque tending to oppose the load. However, when the load is brought to rest the opposing torque of the alternating current motor inherently tends to drive the load in the opposite direction unless provision is made for applying the friction brake just as the load is brought substantially to rest.

The co-pending application of Tengstrom and Behring, Serial No. 14,276, filed Mar. 9, 1925, discloses and claims a system for controlling the braking operation of alternating current motors wherein an electromagnetic switch energized responsively to the voltage induced in the rotor windings is utilized for effecting the application of the mechanical brakes when the load is brought substantially to rest.

The present invention in certain of its aspects is an improvement upon the Tengstrom and Behring alternating current motor braking control system. More specifically the present invention provides for braking operation of the alternating current motor in either direction of rotation and also is intended to overcome other difficulties encountered in using the Tengstrom and Behring control.

In accordance with the present invention the driving motor may be connected for motoring operation in either direction, and the power connections of the motor may be reversed to obtain a braking effect to bring the motor to rest after the motoring operation in either direction. Moreover provision is made for applying the mechanical brakes whenever the speed of the motor is reduced to a certain value or the load is brought substantially to rest after operation in either direction. The control of the application of the mechanical brake is accomplished in accordance with the preferred form of the invention through the agency of a small pilot motor of the induction type. The rotor of the small pilot motor is suitably connected to be driven from the shaft of the main driving motor so as to rotate in a corresponding direction. The stator of the pilot motor is connected to the power source to produce phase rotation in one direction when the main driving motor is connected for motoring and braking operation in a corresponding direction of rotation while the stator connections of the pilot motor are reversed to produce phase rotation in the opposite direction when the main motor is connected for motoring and braking operation in the reverse direction of rotation. Thus with the main motor driving the load at normal speed in either direction the voltage induced in the rotor windings of the pilot motor is of relatively low value corresponding substantially to the slip voltage of the main driving motor. On the other hand when the power connections of the main motor are reversed for braking operation in either direction and the speed of rotation of the driving motor and consequently the speed of the rotor of the pilot motor is reduced substantially to zero value, full voltage is induced in the rotor windings of the pilot motor. An electromagnetic relay or switch energized in accordance with the voltage induced in the rotor windings of the pilot motor is arranged to respond to the reduction in rotative speed to substantially zero value after operation of the driving motor in either direction and thereby control the application of the friction brake. In addition suitable time element overload relays are provided for automatically interrupting the reverse power connections of the motor after the application of the friction brake.

The invention may be more fully understood by reference to the accompanying drawing in which the single figure is a schematic diagram showing a reversing braking control system for an alternating current motor and brake embodying the preferred form of the invention.

In the drawing the alternating current driving motor 10 is shown as of the three phase induction type having phase wound rotor windings connected through slip rings to the resistors $R_1$, $R_2$, controlled respectively by the normally open electromagnetic switch 11 and the normally closed electromagnetic switch 12. While not shown in the drawing, it will be understood that the motor 10 is suitably connected through mechanical gearing to drive and be driven by an active or inertia load such as the trolley hoist on a bridge type crane or other similar load having considerable inertia and requiring frequent starting and stopping. The motor 10 is connected to the three phase alternating current supply lines 13 for both motoring and braking operation in either direction by operation of the reversing switches 14 and 15 under the control of the master controller 16 having the forward, reverse and braking positions indicated in the drawing. Two time element overload protective relays $T_1$ and $T_2$ which may be of the electrically heated thermal responsive type as illustrated are inserted in the motor power connections to protect against continued overloads during motoring operation. As will be pointed out more specifically hereinafter, the time element overload relays $T_1$ and $T_2$ also serve to effect the automatic interruption of the motor circuit after reverse power braking operation in case the operator fails to open the motor circuit.

An electromagnetically controlled friction brake 17 having the brake shoe 18 biased into frictional engagement with the braking drum 19 which is mounted on the shaft of motor 10 or otherwise mechanically connected for stopping and maintaining the motor and the driven load at rest. As shown the brake 17 is provided with three phase operating windings 20 for releasing the brake shoe 17 when energized from the supply lines 13 under the control of the electromagnetic switch 21. The operation of the switch 21 is controlled by the relay 22. In order to energize the relay 22 responsively to the speed conditions of the main driving motor 10, an auxiliary or pilot motor 23 is arranged to be mechanically driven by the main motor 10, preferably being mounted upon the main motor shaft as shown in the drawing. The pilot motor 23 is of the induction type having phase wound rotor windings connected to the slip rings 24. The energization of the stator windings of the auxiliary or pilot motor 23 from the supply lines 13 is controlled by the reversing switches 25 and 26.

The manner in which the control system functions to insure the application of the brake 17 when the load is brought substantially to rest by the braking action of the main motor 10 after operation in each direction is as follows:

The controller 16, in the developed form illustrated, is provided with four operating positions on either side of an intermediate off position. The positions A B and A' B' are the braking positions while the positions C D and C' D' are the motoring positions for operation of the motor 10 in the forward and reverse directions respectively. In order to prevent establishment of the reverse power braking connections for the motor 10 until after completion of motoring operation in either the forward or the reverse direction, the relay 27 is provided and arranged to cooperate with the controller 16 as follows: When the controller 16 is operated from the off position to the right through the braking positions A and B into the first forward motoring position C, the reversing contactors 14, 15 and 25 and 26 for the main motor 10 and the auxiliary pilot 23 all remain unenergized and hence maintain both of the motors 10 and 23 disconnected from the supply lines 13 until the position C is reached. However, in position C the operating winding of the relay 27 is energized through the long contact segment 30 and the short pick up contact segment 31 responsively to the voltage across one of the phases of the supply lines 13. Upon the resulting operation of the relay 27 the upper contact 32 completes a holding circuit for the operating winding thereof through the long contacts segments 30 and 33 thereby maintaining the relay energized independently of the short pick up contact segment 31. At the same time the lower relay contact 34 establishes connection between the upper supply line 13 and the conductor 35. With the conductor 35 thus connected to the upper supply line 13, an energizing circuit for the reversing switch 15 of the main motor 10 is completed through the contact segments 36, 37 and an energizing circuit for the reversing switch 25 of the pilot motor 23 is completed through the contact segments 38 and 39, the circuits being obvious as one terminal of each of the reversing switches is permanently connected to the middle supply line 13. This results in immediate response of the reversing switch 15 to connect the main motor 10 to the supply line 13 for operation in the forward direction with the resistors $R_1$ connected in the rotor circuit. Likewise, the response of the reversing switch 25 connects the pilot motor 23 so as to produce phase rotation thereof in the same direction as the main motor 10. Simultaneously with the establishment of the power connections for the main motor 10 and the pilot motor 23, the operating winding of the contactor 21 is energized through the contact segments 40 and 41, thereby effecting operation of the contactor 21 to connect the windings 20 of the electromagnetic brake 17 to the supply lines 13. This releases the brake shoe 18 and permits the motor 10 to start and accelerate the load in the forward direction with the current limiting resistors $R_1$ in the rotor circuit of the motor. It will be observed that the resistors $R_2$ are normally short-circuited by the normally closed switch 12. After the load driven by the motor 10 is started and accelerated, the controller 16 is advanced into position D. In this position the energizing circuit for the operating winding of electromagnetic switch 11 is established through the controller contacts 7, 42. The circuit may be traced from the upper supply line 13 through the contact 34 of the relay 27, the conductor 35, the segments 38 and 32, the winding of switch 11 to the middle supply line 13. As a result the switch 11 closes its contacts, thereby short-circuiting the resistors $R_1$ to permit full speed operation of the load in the forward direction by the motor 10 with the rotor windings short-circuited.

When it is desired to stop forward rotation of the motor 10, together with the load driven thereby, the controller 16 is returned through the position C to the first braking position B. Upon leaving the position C, the energizing circuit for the motor reversing contactor 15 is interrupted at the segment 37. In position B the operating winding of the reversing contactor 14 is energized through the contact segment 43. This results in reversing the power connections of the motor 10 to the supply lines 13 thereby setting up a torque in the motor 10 actively opposing further rotation of the load in the forward direction. Also in position B of controller 16 an energizing circuit for the electromagnetic switch 12 is established through the contact segment 44, thus causing the opening of the normally closed contactor 12 to include the resistors $R_2$ in the rotor circuit of motor 10 in order to limit the current drawn by the motor 10 from the supply lines 13. The insertion of the resistors $R_2$ in the rotor circuit also serves to cause the opposing torque of motor 10 to attain its maximum value during the initial phase of reverse power braking. When the opposing torque of motor 10 due to the reverse power connections thereof, reduces the speed of the load driven by the motor to some intermediate value between synchronous and zero speed, for example, half speed, the controller 16 then is operated into the braking position A. This results in interrupting the energizing circuit for the electromagnetic switch 12 at the controller contact segment 44. The switch 12 thereupon returns to its normally closed position to short circuit the resistors $R_2$, leaving only the resistors $R_1$ in the rotor circuit of motor 10. This enables the motor 10 to exert substantially maximum opposing torque to further rotation of the load and serves to quickly bring the load substantially to rest.

It will be observed that the reversing contactor 25 of the pilot motor 23 remains energized with the controller 16 in both the braking positions A and B. Thus the pilot motor 23 is maintained connected to the supply line 13 so as to produce phase rotation during braking operation of motor 10 in the same direction as during the motoring operation of motor 10. Furthermore, in both braking positions A and B the circuit through which the operating winding of relay 22 is energized in accordance with the voltage induced in the rotor windings of the pilot motor 23 is completed through the controller contact segments 45 and 46. When the reversed connections of the motor 10 are initially established in position A, the rotor of motor 10, and therefore of the pilot motor 23, is rotating at substantially full speed in the forward direction. Consequently, the voltage induced in the rotor windings of the pilot motor 23 is of relatively low value corresponding substantially to the slip voltage of the motor 10. However, as the controller 16 is operated into position A and the opposing torque of motor 10 brings the load driven thereby substantially to rest, the value of the voltage induced in the rotor windings of the pilot motor 23 gradually increases until substantially full voltage is induced in the rotor windings of the pilot motor. The relay 22 is designed and adjusted to respond to a desired value of induced voltage in the rotor windings of the pilot motor 23 so as to operate its contact to the open positions. Thus as the opposing torque of the main motor 10 brings the load substantially to rest, the voltage induced in the rotor windings of the pilot motor 23 increases to the value required to cause the relay 22 to interrupt the energizing circuit of the operating winding of electromagnetic switch 21. Switch 21 at once returns to the open position in which it is shown thereby disconnecting the operating windings 20 of the brake 17 from the supply lines 13. The brake 17 being biased to the applied position immediately arrests further rotation of the motor 10 and the load driven thereby even though the reversed power torque of motor 10 tends to drive the load in the reverse direction. With the load stopped by application of the brake 17, the controller 16 may be returned to the off position in order to interrupt the reverse power connections of the motor 10 by deenergizing the reversing switch 14. However, in case the rotor should fail to return the controller 16 to the off position the time element overload relays $T_1$, $T_2$, operate automatically after a time interval to open the energizing circuit of the relay 27. This results in the return of the relay 27 to the open position thereby opening the energizing circuit of the reversing switch 14 and disconnecting the motor 10 from the supply lines 13.

As identically the same sequence of operation of the various control elements occurs during motoring and braking operation of motor 10 in the reverse direction, except that the reversing switch 14 of motor 10 is initially operated to produce the motoring operation in the reverse direction and the reversing switch 26 of the pilot motor 23 is operated to produce phase rotation of the pilot motor 23 in the corresponding direction, no further description thereof is deemed necessary.

Thus it will be seen that the present invention enables the braking torque of motor 10 to be utilized after motoring operation in either direction and the electrically controlled friction brake is automatically applied when the opposing motor torque has brought the load substantially to rest. Moreover, the time element overload relays function automatically to interrupt the reverse power connections of the motors after the brake is applied whenever the manual controller is not returned from the braking to the off position.

What I claim as new and desire to secure by Letters Patent of the United States, is:

1. The combination of an alternating current motor, an electromagnetic brake therefor, switch mechanism for establishing power connections to release the brake and effect motoring operation of the motor in each direction, said switch mechanism being operable to establish reverse power braking connections for the motor after motoring operation in each direction, an auxiliary motor mechanically connected to be driven by the first motor and connected under the control of said switch mechanism for phase rotation in a direction corresponding to motoring operations of the first motor during both the motoring and reverse power braking of the motor in each direction, and an electro-responsive switch connected under the control of said switch mechanism to be operated responsively to the voltage induced in the rotor windings of the auxiliary motor when the reverse power braking torque of the first motor brings the same substantially to rest for controlling said electro-magnetic brake to maintain the first motor at rest.

2. The combination of an alternating current induction motor, electroresponsive reversing switches for the motor, an auxiliary alternating current induction motor connected to be mechanically driven by the first motor, electroresponsive reversing switches for the second motor, an electromagnetic brake for the motors biased to the applied position, an electromagnetic switch for energizing the brake to effect release thereof, a master controller having operating positions for operating said switches to release the brake and establish power connections for simultaneous motoring operation of both motors in each direction and having different operating positions for reversing the power connections of the first motor to effect braking operation thereof while maintaining the second motor connected for motoring operation, and a relay arranged to be connected under the control of said controller to be energized in accordance with the voltage induced in the rotor windings of the second motor during motoring operation of the first motor for automatically controlling the electroresponsive control switch of the brake to effect application thereof when the braking torque of the first motor brings the same substantially to rest.

In witness whereof I have hereunto set my hand this 4th day of June, 1927.

CARL SCHIEBELER.